United States Patent [19]
Johnston

[11] 3,862,182
[45] Jan. 21, 1975

[54] PROCESS TO PREPARE NOVEL ANTIBIOTIC INTERMEDIATES
[75] Inventor: David B. R. Johnston, Warren, N.J.
[73] Assignee: Merck and Co., Inc., Rahway, N.J.
[22] Filed: Oct. 11, 1972
[21] Appl. No.: 296,692

[30] Foreign Application Priority Data
Oct. 29, 1971  Great Britain.................... 50491/71

[52] U.S. Cl.......... 260/243 C, 260/239.1, 260/349, 260/694, 424/271, 424/246
[58] Field of Search................. 260/243 C, 694, 349

[56] References Cited
UNITED STATES PATENTS
2,698,347  12/1954  Geraitis.............................. 260/694
3,641,098  2/1972  Buchel............................... 260/465
FOREIGN PATENTS OR APPLICATIONS
770,125  10/1967  Canada.......................... 260/243 C OTHER PUBLICATIONS
Morrison and Boyd, Organic Chemistry, p. 966; p. 798.

Primary Examiner—Donald G. Daus
Assistant Examiner—M. C. Vaughn
Attorney, Agent, or Firm—Hesna J. Pfeiffer; J. Jerome Behan

[57] ABSTRACT

Compounds including 7-hydroxymethyl cephalosporanic acid and derivatives of the 7-hydroxymethyl group are disclosed. In addition, processes are disclosed which yield 7-hydroxymethyl cephalosporanic acid and which further yield valuable derivatives of the 7-hydroxymethyl group. This invention also relates to 6-hydroxymethyl penicillanic acid and analogous derivatives of penicillin.

5 Claims, No Drawings

PROCESS TO PREPARE NOVEL ANTIBIOTIC INTERMEDIATES

In summary, the following cephalosporin compounds can be prepared using the processes of this invention:

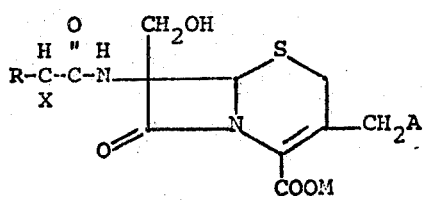

I wherein R is hydrogen, phenyl, phenoxy, or a heterocyclic moiety having 1-2 hetero atoms, the latter being either O, S, or N, such as thienyl or furyl; X is hydrogen, amino, or carboxyl; A is hydrogen, loweralkanoyloxy, carbamoyloxy, or pyridinium; and M is an alkali metal such as sodium or potassium, benzhydryl, methoxymethyl, or hydrogen.

In addition, the following penicillin compounds can also be prepared:

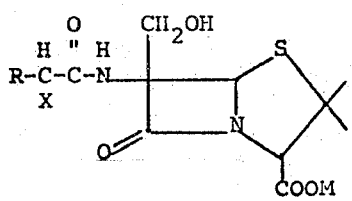

II wherein R is hydrogen, phenyl, phenoxy, thienyl, or furyl; M is an alkali metal such as sodium or potassium, benzhydryl, methoxymethyl, or hydrogen; and X is hydrogen, amino, or carboxyl.

The hydroxymethyl substituent can be further reacted to yield the following substituents (at position 7 in the cephalosporin series, at position 6 in the penicillin series): sulfonylmethyl, halomethyl, aminomethyl, azidomethyl, or methyl.

The free acids and salts of this application of Formulas I and II are useful in the control and treatment of bacterial infections, gram-negative as well as gram-positive. When the compounds having an amido group are prepared, activity against gram-negative organisms is enhanced, and resistance to β-lactamases is demonstrated. Activity includes effectiveness against many bacteria, including in vivo against *Proteus morganii*, and in addition, effectiveness against the following gram-negative bacteria: *Escherichia coli*, *Proteus vulgaris*, *Proteus mirabilis*, *Salmonella schottmuelleri*, *Klebsiella pneumoniae AD*, *Klebsiella pneumoniae B*, and *Paracolobactrum arizoniae*. Specific bactericidal activity is dependent upon the exact structure of the final product; not all compounds are active against all organisms. The esters of Formulas I and II are converted to the biologically active salts and free acids as described herein or in the art.

It is, therefore, an object of this invention to provide novel processes for preparing novel compounds and novel intermediate compounds, the final products having highly unusual anti-bacterial properties.

The novel processes of this invention can be described as follows.

There is first provided an easy route which results in the introduction of a hydroxymethyl group, in the 7-position of the cephalosporin nucleus, or in the 6-position of the penicillin nucleus. This route is summarized in Flow Sheet I.

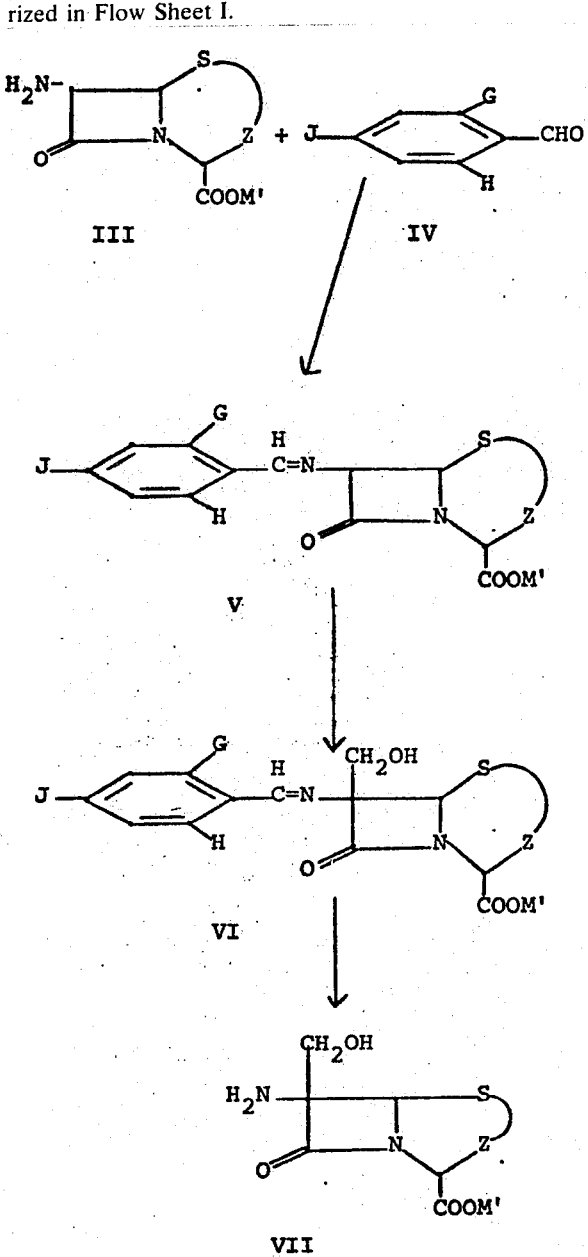

wherein M' is benzyl, benzhydryl, trimethylsilyl, trichloroethyl, methoxymethyl, benzoylmethyl, or methoxybenzyl; and J, G, and H are as hereinafter defined.

Specifically, the starting material is either a 6-aminopenicillanic acid or 7-amino-cephalosporanic acid ester. "—Z—" is used in Formula III to represent either the group

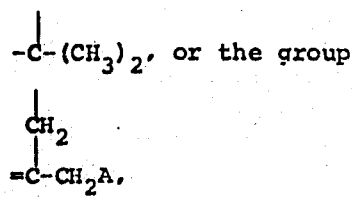

respectively, representing the penicillin or the cephalosporin structures. A is as defined above. The use of Z is appropriate since any of a great number of substituents can depend from that part of the ring, in both the penicillin and the cephalosporin series. The inventive process of this invention, involving as it does the carbon adjacent to the amino group, is not affected by the substituent at Z. One can readily see that the exemplary substituents of this application are illustrative only of preferred embodiments and that many other substituents can be employed.

The reactant IV employed in the first step of the reaction is preferably an aromatic aldehyde having at least one o- or p-electronegative substituent. In other words, at least one of J, G, and H is a substituent selected from the group consisting of nitro, methyl sulfonyl, carboxyl derivatives such as esters or amides, cyano, halo, and the like. The other two of J, G, and H can either be one of the above electronegative substituents, or hydrogen. The preferred reactant is p-nitrobenzaldehyde, where J=nitro, and G and H=hydrogen. Other carbonyl containing compounds, e.g., aldehydes and ketones such as acetone, hexafluoroacetone or chloral which will form stable imino derivatives will also be operable in this invention.

The starting material III and the aromatic aldehyde IV are mixed together in approximately equimolar amounts in an inert solvent. Suitable solvents are dioxane, acetonitrile, dimethylformamide, dimethylsulfoxide, benzene, toluene, and the like. The reaction proceeds readily at temperatures ranging from ambient to reflux temperature of the solvent. Since this condensation is an equilibrium reaction and since water is one of the products of the reaction, water is removed from active participation in further reactions by any of a number of usual methods, including azeotropic distillation, molecular sieves, or borate esters. The particular method is dependent upon the exact parameters of the reaction. The reaction is terminated by evaporation of the solvent. The imino derivative V is then recovered and used in the next step.

The latter involves the substitution of the hydroxymethyl group at the carbon atom adjacent to the imino nitrogen. This reaction takes place in the presence of an inert solvent, such as those listed above, and in the additional presence of an organic or inorganic base. We prefer to use organic bases, such as tertiary amines or pyridine. A specific tertiary amine which is preferred is diisopropylethylamine, although any tertiary lower-alkylamine can be used. Inorganic bases, such as NaH, NaOH, KOH, carbonate, or bicarbonate salts, etc., can also be employed. For instance, the reaction can be conducted in "soft glass" which contains enough inorganic base to catalyze the reaction.

Formaldehyde is the reagent which is employed in the reaction with the imino V to prepare the hydroxymethyl substituent. This compound is compound VI, a novel intermediate which after isolation and purification can be treated in different processes to yield other valuable intermediates and end products.

The purification of compound VI can either be using chromatography or by conversion of the imino moiety to amino in compound VII followed by reaction with the aromatic aldehyde to re-prepare the imino substituent. This latter process, although circuitous, results in high yields and is preferred.

Once the pure compound,

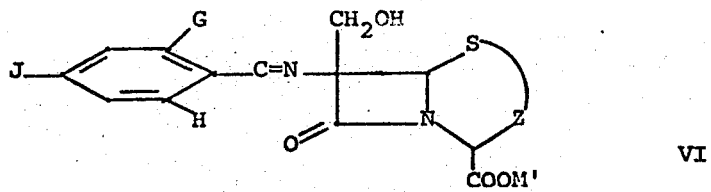

VI (where J, G, H, Z, and M' are as previously defined) is isolated, it can be used to prepare two classes of final compounds: those which have a hydroxymethyl substituent and one of the various

groups at the 7-position of cephalosporin, or at the 6-position of penicillin; (where R and X are as previously defined) or compounds having sulfonatemethyl, methyl, aminomethyl, azidomethyl, or halomethyl in place of (and resulting from) the hydroxymethyl substituent. These latter compounds comprise many novel intermediates and novel final products.

There are two routes of preparing the first class of final compounds, viz.,

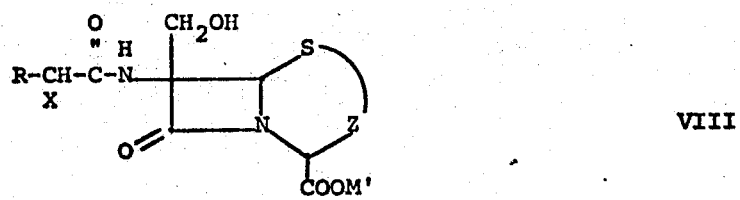

VIII where R, X, Z, and M' are as defined previously, from the intermediate compound VI, as illustrated on Flow Sheet 2.

FLOW SHEET 2

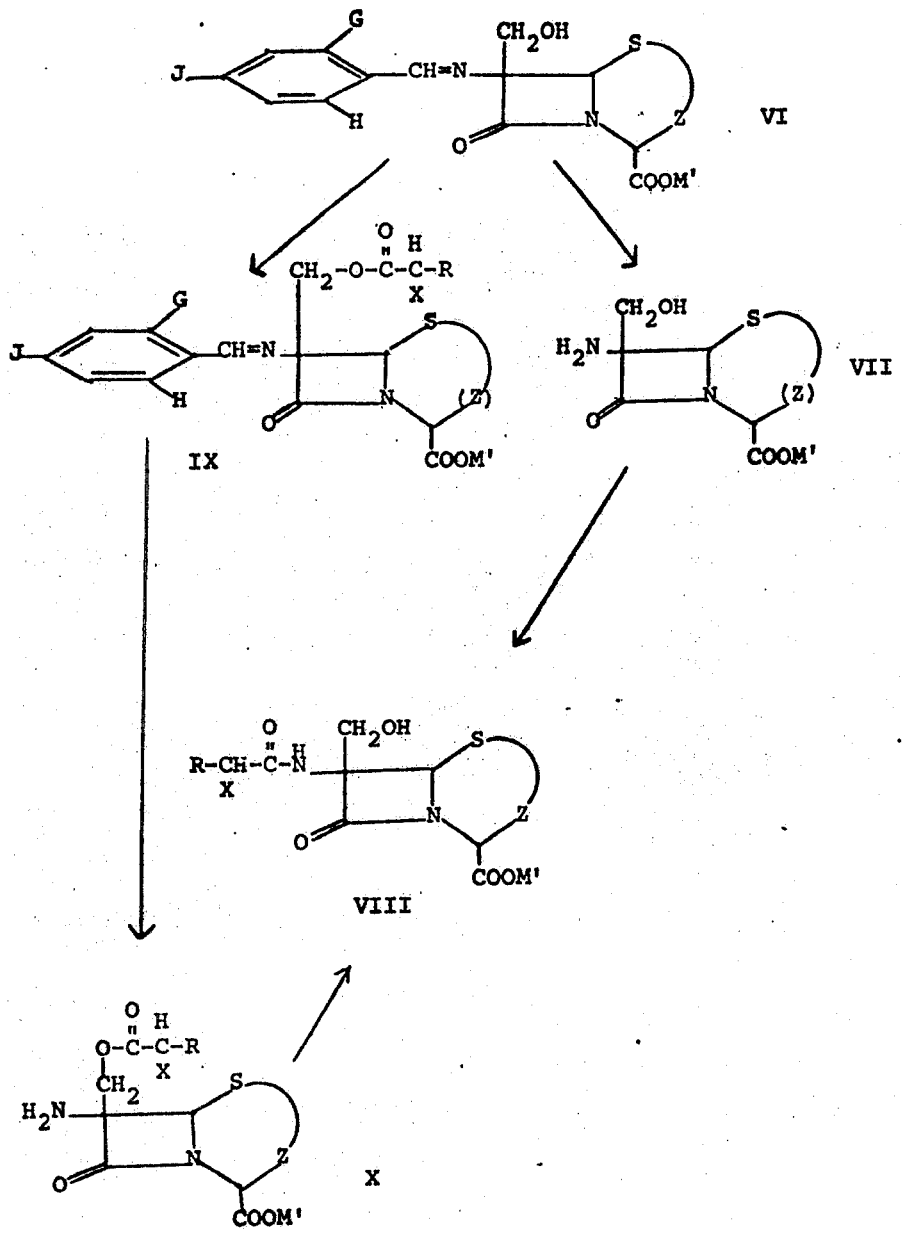

The preparative route VI → VII → VIII, is straight forward, involving first regeneration of amino, followed by N-acylation.

The regeneration takes place through aminolysis or hydrazinolysis, in the presence of a catalytic amount of acid. We can employ aniline hydrochloride which serves both as a source of amine and acid. When hydrazine or hydrazine derivatives such as phenylhydrazine, 2,4-dinitrophenylhydrazine, and the like are used, acid is added; for instance, hydrochloric, p-toluene sulfonic acid. Other hydrazines or amines can be employed. Preferred media are the loweralkanols, such as methanol, ethanol, and the like, or dimethoxyethane or dimethylformamide. The only limitation is that no undesired hydrolysis or ring damage occur.

The final and desired acyl group is then substituted onto the cephalosporin or penicillin nucleus using the appropriate acyl halide, such as acyl chloride as desired, and as defined supra.

The preparative route VI → IX → X → VIII is more complex and involves direct O-acylation, followed by migration of the acyl group to the N subsequent to amino regeneration. First, the hydroxymethyl substituent is acylated. The identity of X and R in Formula IX are identical to those in Formula VIII; Compound IX can be easily prepared from VI using an appropriate acyl halide or anhydride. The free amino group is then regenerated using, preferably, hydrazinolysis, as described above. The intermediate X, although of limited stability, can be isolated and identified as an O-acylated product. After the amino group is regenerated and even during regeneration, the acyl group spontaneously migrates to the N-atom, yielding the desired end product, VIII.

The free acid group at position 4 of the cephalosporin (position 3 of the penicillin) nucleus is blocked during the imino-condensation by using a group (M) which can be removed easily and which does not interfere in the intervening reactions. The blocking group is most conveniently an alcohol, as that the acid ester is formed. Suitable esters in the penicillin series include benzyl, trichloroethyl, trimethylsilyl, phenacyl, methoxymethyl, and the like. Other especially useful esters in the cephalosporin series are the benzhydryl and p-methoxybenzyl esters.

The compounds having sulfonylmethyl, halomethyl, aminomethyl, azidomethyl, or methyl substituents in place of the hydroxy methyl are prepared from the latter via processes described in the following Flow Sheet 3.

wherein R' in XII indicates p-nitrophenyl, p-methylphenyl, methyl, or trifluoromethyl, and the remaining symbols are as defined above. It is noted that the wavy lines indicate portions of the structural formula have been omitted as superfluous in the reactions herein desired.

The first process outlined in Flow Sheet 3, from VI → XII is a key step. Compound XII is a sulfonyloxymethyl derivative of the hydroxymethyl group. The preferred sulfonyloxymethyl groups are the nosylate, tosylate, mesylate, or triflate groups. Respectively, these are prepared from p-nitrobenzenesulfonyl chloride (R'=p-nitrophenyl), p-toluenesulfonyl chloride, (R'=p-methylphenyl), methanesulfonyl chloride, (R'=$CH_3$), or trifluoromethanesulfonic anhydride (R'=$CF_3$).

The sulfonyloxymethyl derivatives are prepared by reacting VI and the chosen reagent in an inert solvent and in the presence of an amine, such as diisopropylethylamine.

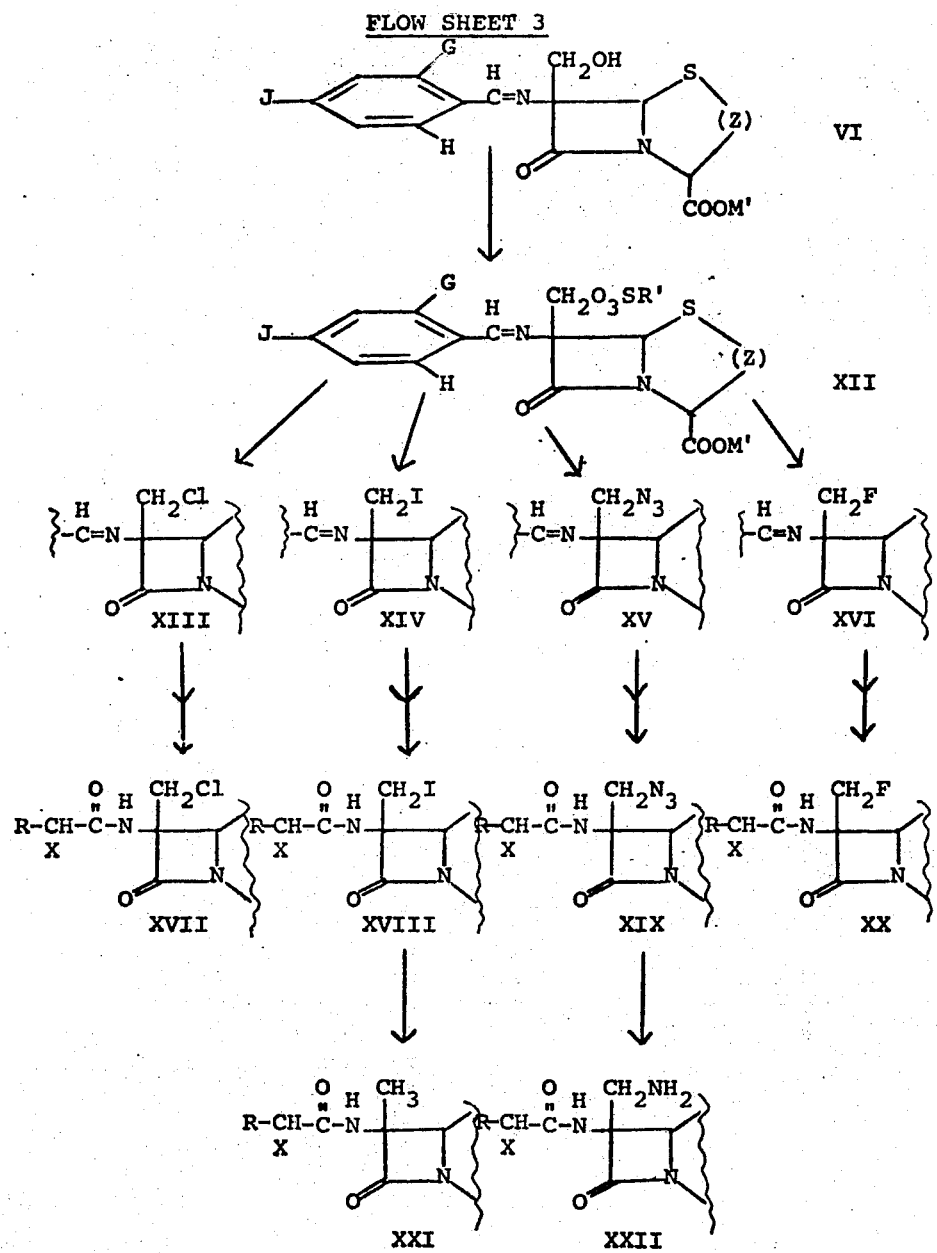

The sulfonyloxymethyl group is then displaced using suitable reagents to yield the compounds XIII, XIV, XV, or XVI. The reagent lithium chloride is used to prepare the chloromethyl substitutent (XIII); lithium iodide to prepare the iodomethyl (XIV); the reagent lithium azide to prepare the azidomethyl (XV); and tetraethylammoniumfluoride to prepare the fluoromethyl XVI.

The latter compounds are then converted to the free amino derivative (not shown on Flow Sheet 3) and to the desired acylamino compound, XVII through XX.

This reaction is the aminolysis or hydrazinolysis more fully described supra. While it is possible to isolate and characterize each intermediate in most cases, and in many cases to take advantage of the crystallinity of the tosylate salt for purification and characterization purposes, it is in practice considerably simpler to isolate the crude tosylate salt and proceed directly to the acylation by using an additional equivalent of potassium acid phosphate to neutralize the tosylate salt and liberate the free amine in situ.

Following acylation, the blocking group at position 3 (of the penicillin) or position 4 (of the cephalosporin) is removed using hydrogenation or other such means. When hydrogenation is used, the iodomethyl group is concomitantly reduced to methyl; the aminomethyl is similarly prepared from the azidomethyl. When hydrogenation is not required to deblock the ester, the iodomethyl and azidomethyl groups remain intact.

When the reactions on the 7-hydroxymethyl group of the cephalosporin are conducted, a certain percentage of product contains material having a $\Delta^2$-double bond, instead of the $\Delta^3$ bond. The two components can be separated; in addition, manipulations to change the $\Delta^2$ to the desired $\Delta^3$ can be accomplished as within the skill of those familiar in the art.

This invention is further illustrated by the following examples.

EXAMPLE 1

Benzyl 6-Hydroxymethyl-6-Amino-Penicillanate

In a half-dram vial are placed 200 mg. of benzyl 6-(p-nitrobenzylideneamino)-penicillanate and 0.5 ml. of N,N-dimethylformamide. A stream of nitrogen is passed briefly through the resultant emerald green solution, followed by a stream of formaldehyde gas in nitrogen generated by heating 50 mg. of paraformaldehyde in a nitrogen stream which is then passed into the Schiff's base solution. The green color is rapidly discharged, to give an orange to yellow solution, which is evaporated to a gum under high vacuum, and flushed twice by dissolving it in a few drops of chloroform and again evaporating to a gum. The resultant material is purified by preparative tlc on a 1,000 $\mu$ silica gel plate with fluorescent indicator, using 20% ethyl acetate in benzene. The yellow band which shows as a dark band under either long or short wave uv light, and which is usually preceded by a deep yellow (visible light) band, is removed and eluted with ethyl acetate. The ir (CHCl$_3$) shoes OH (2.8–3.1 $\mu$), $\beta$-lactam (5.65 $\mu$) and ester (5.72 $\mu$) to be present and the nmr shows the benzylidene and C$_5$-protons as sharp singlets at 532 and 338 ppm downfield from tms in CDCl$_3$. A yield of about 40% of benzyl 6-(4-nitrobenzylideneamino-6-hydroxymethyl-penicillanate is obtained.

Crude benzyl 6-(4-nitrobenzylideneamino)-6-hydroxymethyl-penicillanate, from 2.4 g. of benzyl 6-(p-nitrobenzylideneamino)-penicillanate, in 10 ml. of absolute ethanol and 1 ml. of methylene chloride, is added to a mixture of 1.08 g. of finely powdered 2,4-dinitrophenylhydrazine and 1.04 g. of p-toluenesulfonic acid monohydrate which has been stirred in 10 ml. of absolute ethanol for 30 minutes, and stirring is continued for another 30 minutes, another 10 ml. of absolute ethanol being added half way through. The orange slurry is filtered and the cake is washed repeatedly with small portions of absolute ethanol, after which the combined filtrates are evaporated at or below room temperature under reduced pressure. The resultant solid is slurried with ether containing a few drops of methylene chloride, and after decantation of the liquid and drying, 2.4 g. of salt, suitable for further chemical modification is obtained. Recrystallization from ethanol and ether gives benzyl 6-hydroxymethyl-6-aminopenicillanate, tosylate salt, m.p. 168°–169°C, Calcd. for $C_{23}H_{29}N_2O_7S_2$: C, 54.31; H, 5.55; N, 5.51; S, 12.61. Found: C, 54.01; H, 5.59; N, 5.42; S, 12.54. I.R. (Nujol) NH, OH (2.85, 2.99, 3.7–4.3), $\beta$-lactam (5.63 $\mu$), ester (5.77 $\mu$). The nmr (DMSO-d$_6$) showed peaks at 454, 446, 431, 422 (4H) 445 (5H) 330 (1H), 314 (2H), 274 (1H), 233 (2H), 138 (3H), 97 (3H), and 83 (3H) expressed in cps downfield from tms.

A mixture of 2 ml. of water, 3.5 ml. of ether, and 0.5 ml. of ethyl acetate is prepared and added to a mixture of 100 mg. of benzyl 6-hydroxymethyl-6-aminopenicillanate hydrotosylate and 70 mg. of dipotassium hydrogen phosphate. The combination is shaken vigorously for several minutes, the phases are separated and the organic phase removed. The aqueous layer is re-extracted with 5 ml. of ether, the organic layers are combined and dried with anhydrous magnesium sulfate. After filtration of the mixture, the filtrate is evaporated to a gum under high vacuum at or below ambient temperature, and the gum flushed repeatedly by dissolving it in a small volume of chloroform and evaporating at or below ambient temperature under high vacuum. The gum obtained is benzyl 6-hydroxymethyl-6-amino-penicillanate. It exhibits an ir (neat) spectrum with NH-OH (2.8–3.4 $\mu$), $\beta$-lactam and ester (5.6–5.8 $\mu$) absorptions; the nmr spectrum exhibits peaks at (numbers in Hz from internal tms in CDCl$_3$) 446 (5H), 325 (1H), 313 (2H), 268 (1H), 235 (2H), 145 (braod; 2H), 97 (3H) and 86 (3H). It shows essentially one spot on tlc on 250 $\mu$ silica plates developed with 50% ethyl acetate in benzene.

EXAMPLE 2

Benzyl 6-Hydroxymethyl-6-Phenoxyacetamido-Penicillanate

The benzyl 6-hydroxymethyl-6-amino-penicillanate obtained from 1.2 g. of the tosylate salt is cooled to 0°C. in 5 ml. of methylene chloride and stirred vigorously with 820 mg. of K$_2$HPO$_4$ in 15 ml. of water while 440 mg. of phenoxyacetyl chloride in 10 ml. of dry methylene chloride is added dropwise over a 1 minute period. After vigorous stirring at 0°C. for another 15 minutes, the phases are separated and the aqueous phase is again extracted with methylene chloride and after drying the combined organic phases with magnesium sulfate, the solvent is removed at reduced pressure to give 1.16 g. of crude product which is purified by chromatography on 35 g. silica gel packed in chloroform. Fractions 1–12 are 20 ml. chloroform, 13 and 14 are 30 ml. of 1% ethyl acetate in chloroform while 15 to 21 are 50 ml. of 2.5% ethyl acetate. Evaluation of the fractions by tlc leads to combination of fractions 5–17 to give 676 mg. of purified material, benzyl 6-hydroxymethyl-6-phenoxyacetamidopenicillanate. The ir spectrum (CHCl$_3$) shows NH—OH (2.8–3.1 $\mu$), $\beta$-lactam (5.62 $\mu$), ester (5.73 $\mu$) and amide (5.96 $\mu$) absorption while the nmr (CDCl$_3$) shows peaks at 452–408 (complex 11H; major peaks at 442 and 421), 338 (1H), 312 (2H), 272 (2H), 268 (1H), 253 (2H), 86 (3H) and 82 (3H) expressed in cps downfield from tms. The mass spectrum also showed the desired molecular ion at m/e 470.

EXAMPLE 3

Sodium 6-Hydroxymethyl-7-Phenoxyacetamido-Penicillanate

Hydrogenolysis of benzyl 6-hydroxymethyl-6-phenoxyacetamido-penicillanate in aqueous methanol with an equal weight of 10% Pd/C (Bolhoffer) and one equivalent of sodium bicarbonate for one hour at 40 psi gives, after lyophyllization of the filtered reaction mixture, sodium 6-hydroxymethyl-6-phenoxyacetamido-penicillanate, which displays an ir spectrum (Nujol) with NH—OH (2.8–3.2 $\mu$), $\beta$-lactam (5.68 $\mu$), amide (5.96 $\mu$), and carboxylate (6.26 $\mu$) peaks and an nmr (D$_2$O) with peaks at 452–410 (complex 5H; major peak at 422), 330 (1H), 279 (H$_2$O; obscures $\phi$OCH$_2$CO peak), 252 (1H), 242 (2H), and 84 (6H).

EXAMPLE 4

Benzyl 6-(4-Nitrobenzylideneamino)-6-Acetoxymethyl-Penicillanate

A mixture of 270 mg. benzyl 6-hydroxymethyl-6-4-nitrobenzylideneamino)-penicillanate and 0.1 ml. of a 1:1 mixture of acetic anhydride and pyridine is allowed to stand 16 hours at room temperature, after which it is concentrated to a gum under high vacuum and flushed twice by dissolving the gum in a small volume of chloroform and again evaporating to a gum under reduced pressure. The product is purified by preparative thin-layer chromatography on 1,000 $\mu$ silica plates with fluorescent indicator. The desired band moving, at ~R$_f$ 0.41 in 4% ethyl acetate in chloroform, is recognized by its appearance under both short and long wave length uv light as a dark band. It is removed and eluted with ethyl acetate. The nmr spectrum shows peaks at (numbers) in Hz downfield from internal tms in CDCl$_3$) 531 (1H), 504, 495, 483, 474 (AB quartet; 4H), 446 (5H), 334 (1H), 314 (2H), 289, 278, 274, 262 (AB quartet; 2H), 265 (1H), 124 (3H), 92 (3H), and 86 (3H). The ir (CHCl$_3$ shows the expected pair of carbonyl bands at 5.64 and 5.72 $\mu$. The yield by this procedure is 160 mg. of benzyl 6-(4-nitrobenzylidene-amino-6-acetoxymethyl-penicillanate.

EXAMPLE 5

Benzyl 6-Acetoxymethyl-6-Amino-Penicillanate Hydrotosylate

A mixture of 62 mg. of powdered 2,4-dinitrophenylhydrazine and 59 mg. of p-toluenesulfonic acid monohydrate are stirred in 1.0 ml. of absolute ethanol for 20 minutes. To this is added a solution of 160 mg. of benzyl 6-(4-nitrobenzylideneamino)-6-acetoxymethyl-penicillanate in 1 ml. of absolute ethanol and 0.1 ml. of methylene chloride. After stirring for 30 minutes the mixture is filtered and the cake washed 4–5 times with absolute ethanol. The filtrate is taken to dryness under reduced pressure at or below room temperature and the resultant solid washed several times with ether. The crude benzyl 6-acetoxymethyl-6-amino-penicillanate tosylate salt is characterized by a double carbonyl in the ir spectrum (Nujol: 5.60 and 5.72 $\mu$) and an nmr spectrum with the following peaks (numbers in Hz downfield from internal tms in DMSO-d$_6$) 458, 450, 433, 425 (AB quartet; 4H), 447 (5H), 332 (1H), 315 (2H), 278 (1H), 271 (broad, 2H), 138 (3H), 122 (3H), 97 (3H), 83 (3H).

EXAMPLE 6

Benzyl 6-Acetoxymethyl-6-Amino-Penicillanate

A mixture of 75 mg. of dipotassium hydrogen phosphate, 2 ml. of water, 3.5 ml. of ether and 0.5 ml. of ethyl acetate is prepared. To this is added 120 mg. of benzyl 6-acetoxymethyl-6-amino-penicillanate tosylate salt and the mixture is shaken vigorously. After phase separation and a second extraction of the aqueous phase with 2 ml. of ether, the organic phases are combined and dried with anhydrous magnesium sulfate. After filtration and evaporation of the filtrate under reduced pressure, the resultant gum is flushed twice by taking it up in a small volume of chloroform and again evaporating under reduced pressure to a gum. The product is purified by preparative thin-layer chromatography on 1,000 $\mu$ silica plates with fluorescent indicator. The desired band is located with the help of both long and short wave length uv light, removed, and eluted with ethyl acetate. The ir (neat) shows NH$_2$ (2.95–3.05 $\mu$), $\beta$-lactam (5.61 $\mu$), and ester (5.72 $\mu$) absorption, while the nmr shows peaks at (numbers in Hz from internal tms in CDCl$_3$) 446 (5H), 324 (5H), 314 (2H), 269 (1H), 264 (broad; 2H), 124 (3H), 122 (v. broad; 2H), 96 (3H), and 86 (3H). The tlc on 250 $\mu$ silica developed with 50% ethyl acetate in benzene shows essentially one spot at R$_f$ 0.45. Isolation of the spot and elution with ethyl acetate gives material which displays a strong molecular ion, m/e 378. The product, therefore, is demonstrated to be benzyl 6-acetoxymethyl-6-amino-penicillanate.

EXAMPLE 7

Benzyl 6$\alpha$-Hydroxymethyl-6-Acetamido-Penicillanate

The benzyl 6$\alpha$-acetoxymethyl-6-amino-penicillanate prepared supra is permitted to stand at room temperature. O to N acyl migration slowly takes place; thus tlc examination of initially tlc homogeneous benzyl 6-acetoxymethyl-6-penicillanate over a period of time shows the development of a second more polar spot, R$_f$ $\cong$ 0.15 (50% ethyl acetate in benzene). When the reaction has progressed sufficiently far, (i.e., after about 2–8 hours) the more polar material may be isolated by preparative tlc. It displays an ir (neat) spectrum with NH, OH (2.8-3.2 $\mu$), $\beta$-lactam and benzyl ester (5.6–5.8 $\mu$), $z^{-1}$ amide (5.99 $\mu$) bands. The nmr spectrum displays the following peaks (numbers in Hz from internal tms in CDCl$_3$) 446 (5H), 365 (broad; 1H), 339 (1H), 314 (2H), 268 (1H), 250 (2H), 125 (3H), 96 (3H), and 84 (3H). The product is, therefore, identified as benzyl 6$\alpha$-hydroxymethyl-6-acetamido-pencillanate.

Using the same general procedures as in Examples 5, 6, and 7, benzyl 6-phenylacetoxymethyl-6-amino penicillanate is prepared by reacting benzyl 6-phenylacetoxymethyl-6-amino penicillanate tosylate and dipotassium hydrogen phosphate. The reactants are mixed as in Example 6. After a few minutes wait, thin layer chromatography shows that the formerly single spot material shows a new major spot, eluted with 1:1 ethylacetate:benzene on 250 μ silica plates having a significantly lower R$_f$. Isolation of the new spot using preparative tlc indicates that it is benzyl N-phenylacetyl-6-hydroxymethyl-6-amino penicillanate having NMR and IR consistent with the assigned structure.

EXAMPLE 8

Preparation of 6-Sulfonyloxymethyl Derivatives of Benzyl 6-(4-Nitrobenzylideneamino)-Penicillanate Nosylate A mixture of 2.94 g. of benzyl 6-(4-nitrobenzylideneamino)-6-hydroxymethyl-penicillanate and 1.57 g. of p-nitrobenzenesulfonyl chloride in 20 ml. of dry methylene chloride is stirred and treated with 915 mg. of diisopropylethylamine in 5 ml. of dry methylene chloride. Stirring is continued for 4.5 hours, after which the solution is washed with water, 1.24 g. of K$_2$HPO$_4$ in water, and water again, dried with magnesium sulfate and concentrated to a foam: 4.1 g. Chromatography on 120 g. silica gel packed in benzene. After 1.7–1.8 liters of benzene eluate have been removed, tlc indicates the emergence of the desired material, which is obtained in the next 300–400 ml. giving ca 1.3 g. The ir (CHCl$_3$) shows essentially no OH, and bands for β-lactam (5.62 μ) and ester (5.71 μ). The nmr (CDCl$_3$) shows peaks at 518 (1H), 500–465 (complex pair of quartets, 8H), 442 (5H), 327 (1H), 312 (2H), 277 (2H), 260 (1H), 89 (3H) and 82 (3H), expressed in cps downfield from this. The product is benzyl 6-(p-nitrophenyl)-sulfonyloxymethyl-6-(4-nitrobenzylideneamino)-penicillanate.

B. Tosylate

When the above reaction is carried out using p-toluenesulfonyl chloride in place of the p-nitrobenzenesulfonyl chloride, the tosylate is obtained: ir (CHCl$_3$), β-lactam (5.61 μ), ester (5.71 μ); nmr (CDCl$_3$) 518 (1H), 498, 489, 474, 466 (4H), 466, 458, 436, 427 (4H), 442 (5H), 326 (1H), 311 (2H), 267 (2H), 259 (1H), 141 (3H), 86 (3H), and 80 (3H), expressed in cps downfield from tms. The product is benzyl 6-(p-methylphenyl)-sulfonyloxymethyl-6-(4-nitrobenzylideneamino)-penicillanate.

C. Mesylate

When the above reaction is carried out using methanesulfonyl chloride in place of the p-nitrobenzenesulfonyl chloride, the mesylate is obtained: ir (CHCl$_3$), β-lactam (5.62 μ), ester (5.71 μ); nmr (CDCl$_3$) 532 (1H), 505, 499, 483, 476 (4H), 447 (5H), 328 (1H), 314 (2H), 282 (2H), 266 (1H), 182 (3H), 92 (3H), and 86 (3H). The product is benzyl 6-methylsulfonyloxymethyl-6-(4-nitrobenzylideneamino)-penicillanate.

D. Triflate

When the above reaction is carried out using trifluoromethanesulfonic anhydride, the triflate is obtaine: ir (CHCl$_3$), β-lactam (5.61 μ), ester (5.71 μ); nmr (CDCl$_3$) 525 (1H), 500, 492, 480, 471 (4H), 441 (5H), 331 (1H), 311 (2H), 295 (2H), 265 (1H), 90 (3H), and 84 (3H), expressed in cps downfield from tms. The product is benzyl 6-trifluoromethylsulfonyloxymethyl-6-(4-nitrobenzylideneamino)-penicillanate.

EXAMPLE 9

Displacement Reactions with 6-Sulfonyloxymethyl Compounds

A. Benzyl 6-Azidomethyl-6-(4-Nitrobenzylideneamino)-Penicillanate

A mixture of 575 mg. of lithium chloride and 883 mg. of sodium azide is stirred overnight with 13.6 ml. of sieve dried DMSO. The suspension is centrifuged and 500 mg. of benzyl 6-(4-nitrobenzenesulfonyloxymethyl)-6-(4-nitrobenzylideneamino)-penicillanate is dissolved in 8.2 ml. of the supernatant liquid. After standing at room temperature for 2.8 hours, the mixture is poured into 30 ml. of ice water and 30 ml. of ethyl acetate. After shaking and phase separation, the aqueous layer is again extracted with ethyl acetate, the combined organic layers are dried with magnesium sulfate and the solution concentrated to 397 mg. of oil. After purification by preparative tlc on five 1,000 μ 8 inches × 8 inches silica plates developed with 5% ethyl acetate in chloroform, 340 mg. of product are obtained. The ir (CHCl$_3$) shows azide (4.76 μ), μ-lactam (5.66 μ) and ester (5.71 μ bands; the nmr (CDCl$_3$) exhibits peaks at 517 (1H), 492, 483, 472, 464 (4H), 435 (5H), 325 (1H), 308 (2H), 261 (1H), 229 (2H), 89 (3H), and 83 (3H), expressed in cps downfield from tms. The product is benzyl 6-azidomethyl-6-(4-nitrobenzylideneamino)-penicillanate.

The same material can be prepared using the tosylate derivative in place of the nosylate; in this case the reaction mixture is allowed to stand at room temperature overnight followed by heating for 9 hours at 50°C.

B. Benzyl 6-Iodomethyl-6-(4-Nitrobenzylideneamino)-Penicillanate

A solution of 591 mg. of lithium iodide in 4.3 ml. of sieve dried DMSO is prepared and to it is added 300 mg. of benzyl 6-(4-nitrobenzenesulfonyloxymethyl)-6-(4-nitrobenzylideneamino)-penicillanate. The solution is stirred for 48 hours at room temperature and worked up and purified as in the azidomethyl series to give 189 mg. of yellow foam. The ir spectrum (CHCl$_3$) shows β-lactam (5.64 μ) and ester (5.71 μ) peaks, while the nmr (CDCl$_3$) shows peaks at 523 (1H), 502, 493, 473, 474 (4H), 444 (5H), 329 (1H), 314 (2H), 264 (1H), 226 (2H), 91 (3H), and 85 (3H), expressed in cps downfield from tms. The product is benzyl 6-iodomethyl-6-(4-nitrobenzylideneamino)-penicillanate.

The same material can be obtained if the mesylate derivative is substituted from the nosylate; heating the reaction mixture at 50°C. for 24 hours effects almost complete conversion to the iodomethyl compound.

C. Benzyl 6-Chloromethyl-6-(4-Nitrobenzylideneamino)-Penicillanate

A 1 M. solution of lithium chloride in sieve dried DMSO is prepared and 50 mg. of benzyl 6-(4-nitrobenzenesulfonyloxymethyl)-6-(4-nitrobenzylideneamino)-penicillanate is dissolved in 0.5 ml. of the solution. After standing at room temperature for 17 hours, the reaction mixture is worked up as in the previous examples to give 25 mg. of product. The nmr spectrum (CDCl$_3$) exhibited peaks at 513 (1H), 488, 480, 469, 461 (4H), 433 (5H), 325 (1H), 306 (2H), 259 (1H), 238 (2H), 89 (3H), and 83 (3H), expressed in cps downfield from tms. The product is benzyl 6-chloromethyl-6-(4-nitrobenzylideneamino)-penicillanate.

D. Benzyl 6-Fluoromethyl-6-(4-Nitrobenzylideneamino)-Pencillanate

A solution of 444 mg. of dried Et₄NF in 5 ml. of acetonitrile is added to 855 mg. of benzyl 6-trifluoromethanesulfonyloxymethyl-6-(4-nitrobenzylideneamino)-penicillanate. After 2.3 hours, the mixture is worked up as in the previous examples to give 134 mg. of product. The ir (CHCl₃) shows β-lactam (5.65 μ) and ester (5.72 μ) peaks; the nmr (CDCl₃) shows peaks at 524 (1H), 496, 488, 477, 468 (4H), 439 (5H), 331 (1H), 311 (2H), 264 (1H), 90 (3H), and 84 (3H), expressed in cps downfield from tms. The product is benzyl 6-fluoromethyl-6-(4-nitrobenzylideneamino)-penicillanate.

EXAMPLE 10

A. Benzyl 6-Azidomethyl-6-Phenoxyacetamido-Penicillanate

A mixture of 132 mg. of p-toluenesulfonic acid monohydrate and 137 mg. of finely ground 2,4-dinitrophenylhydrazine is stirred for 0.5 hour in 3 ml. of absolute ethanol. To the slurry is added 340 mg. of benzyl 6-azidomethyl-6-(4-nitrobenzylideneamino)-penicillanate from Example 9A in 3 ml. of absolute ethanol and 2 ml. of methylene chloride, washed in with another 3 ml. of ethanol, and the mixture is stirred for 0.8 hours. Filtration, and evaporation of the filtrate at or below room temperature under reduced pressure gives, after washing the residue with ether, 328 mg. of a crystalline yellow solid. To this is added, with stirring in an ice bath, 132 mg. of phenoxyacetyl chloride in 3 ml. of methylene chloride and 335 mg. of K₂HPO₄ in 3 ml. of water, rinsed in with another 2 ml. each of water and methylene chloride. After vigorously stirring for 20 minutes at 0°C., the mixture is treated with 62 μl of pyridine, stirred for 5 more minutes, and allowed to settle. The phases are separated and the aqueous phase further extracted with 2 ml. of methylene chloride and 2 ml. of ether. The organic phases are combined, dried with magnesium sulfate, and concentrated to a gum under reduced pressure. The 347 mg. of crude product so obtained are purified by preparative tlc on four 1,000 μ 8 inches × 8 inches silica plates developed with 5% ethyl acetate in chloroform. By this procedure, 282 mg. of product are obtained: ir (CHCl₃) NH (2.9–3.2 μ), azide (4.74 μ), β-lactam (5.60 μ), ester (5.72 μ), and amide (5.92 μ). The nmr spectrum (CDCl₃) exhibits peaks at 444–403 (complex 11H; main peaks at 436 and 415), 327 (1H), 308 (2H), 269 (2H), 266 (1H), 241 (2H), 84 (3H), and 81 (3H). The product is identified as benzyl 6-azidomethyl-6-phenoxyacetamido-penicillanate.

B. Benzyl 6-Iodomethyl-6-Phenoxyacetamido-Penicillanate

By a procedure corresponding to that just described, benzyl 6-iodomethyl-6-(4-nitrobenzylideneamino)-penicillanate is converted to benzyl 6-iodomethyl-6-phenoxyacetamido-penicillanate. The nmr spectrum (CDCl₃) shows peaks at 443–401 (complex of 11H; main peaks at 435 and 414), 322 (1H), 307 (2H), 268 (2H), 265 (1H), 258, 248, 229, 218 (2H), and 82 (6H).

C. Benzyl 6-Chloromethyl-6-phenoxyacetamido Penicillanate

By a procedure corresponding to that just described, benzyl 6-chloromethyl-6-(4-nitrobenzylideneamino)-penicillanate is converted to benzyl 6-chloromethyl-6-phenoxyacetamido-penicillanate. The nmr spectrum (CDCl₃) shows peaks at 437–397 (complex 11H; main peaks at 430 and 408), 326 (1H), 303 (2H), 265 (2H), 262 (1H), 262, 250, 243, 231 (2H), 82 (3H), and 80 (3H), expressed in cps downfield from tms.

D. Benzyl 6-Fluoromethyl-6-phenoxyacetamido-penicillanate

By a procedure corresponding to that just described, benzyl 6-fluoromethyl-6-(4-nitrobenzylideneamino)-penicillanate is converted to the compound benzyl 6-fluoromethyl-6-phenoxyacetamido-penicillanate. The ir spectrum (CHCl₃) shows peaks at 5.60 μ (β-lactam), 5.72 μ (ester) and 5.91 μ (amide), while the nmr (CDCl₃) shows peaks at 448–392 (complex 11H; main peaks at 439 and 418), 337 (1H), 318, 316 (1H), 310 (2H), 270 (4H), 86 (3H), and 82 (3H), expressed in cps downfield from tms.

EXAMPLE 11

Hydrogenolysis of benzyl esters

A. Sodium 6-Aminomethyl-6-Phenoxyacetamido-Penicillanate

A 10% solution of the benzyl 6-azidomethyl-6-Phenoxyacetamido-Penicillanate is prepared in methanol. Water is added dropwise to the cloud point, and hydrogenation is initiated at 40 psi for 0.5–1.0 hour with one equivalent of sodium bicarbonate and a portion of 10% Pd/C (Bolhofer catalyst) equal in weight to the ester. The reaction mixture is then filtered, lyophyllized, and partitioned between small volumes of water and methylene chloride or ethyl acetate to remove unreacted ester. The aqueous phase is then lyophyllized again to give the final product. Reduction of benzyl 6-azidomethyl-6-phenoxyacetamido-penicillanate leads to concomitant reduction of the azidomethyl function to an aminomethyl function. The product obtained has an nmr (D₂O) spectrum with peaks at 448–407 (complex 10H; main peak at 420), 332 (1H), 283 (2H), 279 (strong H₂O peak), 254 (1H), 224 (2H), 92 (3H), and 86 (3H) expressed in cps downfield from tms. Some pH dependence is noted in the positions of the 254 and 224 cps peaks. The product is sodium 6-aminomethyl-6-phenoxyacetamido-penicillanate.

B. Sodium 6-Methyl-6-Phenoxyacetamido-Penicillanate

Reduction of benzyl 6-iodomethyl-6-phenoxyacetamido-penicillanate leads to concomitant reduction of the iodomethyl function to a methyl group; hence two equivalents of sodium bicarbonate are used to neutralize the acids generated. Removal of sodium iodide from the lyophyllizate is accomplished by generating the free penicillanic acid in concentrated aqueous solution at 0°C. with dilute phosphoric acid and rapidly extracting with cold ethyl acetate. The free acid, in (CDCl₃), exhibits an nmr spectrum with peaks at 448–404 (complex 10–11H with main peak at 419), 325 (1H), 272 (2H), 265 (1H), 109 (3H), and 90 (6H), expressed in cps downfield from tms. Treatment with one equivalent of sodium bicarbonate solution and lyophyllization gives the sodium salt which exhibits an nmr spectrum (D₂O) with peaks at 450–408 (complex 10H; main peak at 421) 321 (1H), 278 (intense water peak, obscuring φOCH₂CO), 251 (1H), 104 (3H), and 86 (6H) expressed in cps downfield from tms. This product is sodium 6-methyl-6-phenoxyacetamido-penicillanate.

C. Sodium 6-Chloromethyl-6-Phenoxyacetamido-Penicillanate

Reduction of benzyl 6-chloromethyl-6-phenoxyacetamido-penicillanate by the above procedure affords the title compound, which exhibits an nmr spectrum ($D_2O$) with peaks at 448–406 (complex 10H; main peak at 419, 328 (1H), 280 (2H), 252 (1H), 249 (2H), 87 (3H) and 85 (3H), expressed in cps downfield from tms. This product is sodium 6-chloromethyl-6-phenoxyacetamido-penicillanate.

D. Sodium 6-Fluoromethyl-6-Phenoxyacetamido-Penicillanate

Reduction of benzyl 6-fluoromethyl-6-phenoxyacetamido-penicillanate by the general procedure affords the title compound which exhibits an nmr spectrum ($D_2O$) with peaks at 440–396 (complex 10H; main peak at 412), 326 (1H), 309 (1H), 275 (HOD peak; obscures $\phi OCH_2CO$), 264 (1H), 250 (1H), and 88 (6H). This product is identified as sodium 6-fluoromethyl-6-phenoxyacetamido-penicillanate.

EXAMPLE 12

Benzhydryl 7-(4-Nitrobenzylideneamino)-Cephalosporanate

An equimolar mixture of benzhydryl 7-aminocephalosporanate and 4-nitrobenzaldehyde is heated under nitrogen in 200 ml. of benzene per gram aldehyde, and the water azeotropically removed over a one hour period. The solution is evaporated under reduced pressure to give a foam. The ir ($CHCl_3$) shows bands at 5.60 ($\beta$-lactam) and 5.75 $\mu$ (esters), while the nmr shows peaks at (numbers are in Hz from internal tms in $CDCl_3$) 518, 516 (1H), 496, 487, 475, 466 (AB quartet; 4H), 439 (10H), 416 (1H), 330, 328, 325, 323 (doublet of doublets; 1H), 311, 306 (1H), 308, 295, 288, 274 (AB quartet; 2H), 227, 209, 206, 187 (AB quartet; 2H), and 119 (3H). Thin-layer chromatography on 250 $\mu$ silica plates with 10% ethyl acetate in chloroform shows essentially one spot at Rf ≅ 0.58; only traces of the starting materials can be detected. The product is identified as benzhydryl 7-(4-nitrobenzylideneamino)-cephalosporonate.

EXAMPLE 13

Benzhydryl 7-Hydroxymethyl-7-(4-Nitrobenzylideneamino)-Cephalosporanate

A gentle stream of nitrogen is passed into a half-dram vial containing 60 mg. of benzhydryl 7-(4-nitrobenzylideneamino)-cephalosporanate and after a few minutes 0.3 ml. of N,N-dimethylformamide is added. The nitrogen stream is continued, bubbling through the greenish brown solution for about 30 seconds, and then a stream of formaldehyde gas in nitrogen, generated by heating 15 mg. of paraformaldehyde in a nitrogen stream, is passed through. The color is discharged and the resultant solution is evaporated to a gum under high vacuum. The gum is flushed by dissolving it in a small volume of chloroform and again evaporating to a gum under high vacuum. The product exhibits an ir (neat) spectrum with hydroxy (2.9–3.1), $\beta$-lactam (5.64 $\mu$) and ester (5.75 $\mu$) absorption. The nmr spectrum in $CDCl_3$ shows the expected singlet for the benzylidene proton, new absorption associated with the hydroxymethyl group. The observed peaks are 517 (1H); 486, 478, 467, 458 (4H); 431 (10H); 407 (1H); 305 (1H); 300, 288, 282, 268 (2H); 240 (2H); 222, 204, 198, 180 (2H), 116 (3H), expressed in cps downfield of tms. The product is benzhydryl 7-hydroxymethyl-7-(4-nitrobenzylideneamino)-cephalosporanate.

EXAMPLE 14

Benzhydryl 7-Hydroxymethyl-7-Amino-Cephalosporanate Tosylate Salt

A mixture of 100 mg. of powdered 2,4-dinitrophenylhydrazine, 85.5 mg. of p-toluene sulfonic acid monohydrate, and 3 ml. of absolute ethanol are stirred for 30 minutes. To this is added a solution of 304 mg. of benzhydryl 7-hydroxymethyl-7-(4-nitrobenzylideneamino)-cephalosporanate in 3 ml. of ethanol and 0.5 ml. of methylene chloride. The mixture is stirred for 30 minutes, filtered, and after the filter cake has been thoroughly washed with ethanol, the filtrates are evaporated under reduced pressure at or below ambient temperature. The resultant gum exhibits an ir spectrum ($CHCl_3$ evaporate) with $\beta$-lactam (5.60 $\mu$) and ester (5.76 $\mu$) absorption, and is identified as benzhydryl 7-hydroxymethyl-7-aminocephalosporanate tosylate salt.

EXAMPLE 15

Benzhydryl 7-Hydroxymethyl-7-Amino-Cephalosporanate

A mixture of 3.5 ml. of ether, 0.5 ml. of ethyl acetate, 2 ml. of water and 22 mg. of dipotassium hydrogen phosphate is prepared. To this is added 100 mg. of benzhydryl 7-hydroxymethyl-7-aminocephalosporanate tosylate salt and the mixture is shaken vigorously for several minutes. After phase separation the aqueous phase is again extracted with ether, the combined organic phases are dried with anhydrous magnesium sulfate, and evaporated to a gum under reduced pressure. The product is flushed several times by dissolving it in a small volume of chloroform and again evaporating to a gum under high vacuum. The product, benzhydryl 7-hydroxymethyl-7-aminocephalosporanate is purified by preparative tlc on silica gel using ethyl acetate (Rf~0.5). It exhibits an nmr spectrum ($CDCl_3$) with peaks at 444 (10H); 421 (1H), 307, 294, 289, 275 (2H), 291 (1H), 235 (2H), 226, 207, 203, 184 (2H), 158 (B, 2H), 120 (3HO, expressed in cps downfield from tms. The ir ($CHCl_3$) showed NH—OH (2.8–3.1 $\mu$), $\beta$-lactam (5.60 $\mu$) and ester (5.74 $\mu$) absorption.

EXAMPLE 16

Benzhydryl 7-(2Thienylacetoxymethyl)-7-(4-Nitrobenzylideneamino)-Cephalosporante A solution of 90 mg. of benzhydryl 7-hydroxymethyl-7-(4-nitrobenzylideneamino)-cephalosporanate in 0.3 ml. of dry methylene chloride is cooled to 0°C. and treated with 0.5 ml. of dry methylene chloride containing 100 mg. of pyridine, also cooled to 0°C. To this is added with cooling and stirring, over ten minutes a cooled solution of 2.5 mg. of 2-thienylacetyl chloride in 0.25 ml. of dry methylene chloride, and held for 2 hours at 0°C. The mixture is then shaken with a solution of 55 mg. of dihydrogen dipotassium hydrogen phosphate in 3 ml. of water, the organic phase is removed, dried with anhydrous magnesium sulfate and taken to a gum under high vacuum. The gum is flushed by dissolving it in a small volume of chloroform and again evaporating it to a gum under reduced pressure. The product is purified by preparative tlc on 1,000 μ silica plates with fluorescent indicator. After development with 5% ethyl acetate in chloroform, the desired band is located with the aid of both short and long wave uv light, removed, and eluted with ethyl acetate. The product exhibits ir and nmr spectra consistent with the structure assigned, benzhydryl 7-(2-thienylacetoxymethyl)-7-(4-nitrobenzylideneamino)-cephalosporanate.

EXAMPLE 17

Benzhydryl 7-(2-Thienylacetoxymethyl)-7-Amino-Cephalosporanate

A mixture of 15.9 mg. of powdered 2,4-dinitrophenylhydrazine, 13.5 mg. of p-toluene sulfonic acid, and 2 ml. of absolute ethanol is stirred for 30 minutes. To this is added a solution of 58 mg. of benzhydryl 7-(2-thienylacetoxymethyl)-7-(4-nitrobenzylideneamino)-cephalosporanate in 1.5 ml. of ethanol and 0.2 ml. of methylene chloride. After stirring for 30 minutes, the mixture is filtered, and the cake washed thoroughly with ethanol. The filtrate is evaporated under reduced pressure at or below ambient temperature and the resultant solids washed several times with ether. The solids are shaken with a mixture of 28 mg. of dipotassium hydrogen phosphate, 2 ml. of water and 4 ml. of ether, the phases are separated, and the aqueous phase is again extracted with ether. The combined organic phases are dried with anhydrous magnesium sulfate, and evaporated to a gum under high vacuum. The product is purified by preparative tlc on 1,000 μ silica plates with fluorescent indicator using 30% ethyl acetate in benzene as eluent. After locating the desired band with the help of both short and long wave length uv light, it is removed and eluted with ethyl acetate. The product exhibits the desired ir and nmr absorptions, and is essentially homogeneous by tlc; it is identified as benzhydryl 7-(2-thienylacetoxymethyl)-7-amino-cephalosporanate.

EXAMPLE 18

Benzhydryl 7-Hydroxymethyl-7-(2-Thienylacetamido)-Cephalosporanate

Pure benzhydryl 7-(2-thienylacetoxymethyl)-7-amino-cephalosporanate undergoes spontaneous O to N acyl migration at ambient conditions. When the migration has proceeded to a satisfactory extent as judged by tlc, the substantially more polar product, benzhydryl 7-hydroxymethyl-7-(2-thienylacetamido)-cephalosporanate may be isolated by preparative tlc or chromatography on silica. It exhibits an ir spectrum (CHCl$_3$ evaporate) with OH, NH absorption at 2.85–3.05, β-lactam at 5.60, ester at 5.37, and amide at 5.99 μ. The nmr in CDCl$_3$ exhibited bands at 440, 435, 430, 419, 415, 413, and 409 (complex of 15 protons, the exact pattern of which is concentration dependent), 312, 209, 293 and 279 (2H), 305 (1H), 249 (B, 2H), 229 (2H), 204 (B, 2H), 120 (3H), (expressed in ppm downfield of internal tms). The product is identified as benzhydryl 7-hydroxymethyl-7-(2-thienylacetamido)-cephalosporanate.

EXAMPLE 19

Sodium 7-Hydroxymethyl-7-(2-Thienylacetamido)-Cephalosporanante

A solution of 586 mg. of benzhydryl 7-hydroxymethyl-7-(2-thienylacetamido)-cephalosporanate in 5 ml. of anisole is treated with 15 ml. of trifluoroacetic acid at room temperature. After 10 minutes, the reaction mixture is taken to a gum under reduced pressure and flushed several times by redissolving the residue in chloroform and again evaporating to a gum under reduced pressure. The residue is next dissolved in 25 ml. of chloroform and stirred vigorously for 20 minutes with 25 ml. of water and 0.17 g. sodium bicarbonate, the phases are separated, and the organic phase washed again with water. The aqueous phases are combined and after washing twice with methylene chloride, are lyophyllized to give 501 mg. of powdery foam. The nmr (D$_2$O) shows peaks at 441, 438, 435, 421 and 417 (3H), 296 (1H), 286 and 284, the complete pattern being obscured by the intense water peak at 280, 246 (2H), 232 (2H), 227, 209, 200, 162 (2H), 126 (3H) expressed in ppm downfield from tms. In pH 7 buffer, the salt had λmax 237 mμ, E% 196 and λinf 255 mμ, E% 138. The product is sodium 7-hydroxymethyl-7-(2-thienylacetamido)-cephalosporanate.

EXAMPLE 20

7-Hydroxymethyl-7-(2-Thienylacetamido)-Cephalosporanic Acid

A 20% aqueous solution of sodium 7-hydroxymethyl-7-(2-thienylacetamido)-cephalosporanate is cooled in ice and treated with twice the calculated amount of an ice cold solution of phosphoric acid in 5 volumes of water. The curdy precipitate is immediately extracted with 5 portions of ice cold ethyl acetate. As each extraction is completed the organic phase is added directly to a portion of anhydrous magnesium sulfate, kept in a flask in an ice bath. The combined organic extract is filtered and evaporated under reduced pressure with the temperature kept below 25°C. to give a gum. It is taken up quickly in the minimum volume of ethyl acetate and transferred to a centrifuge tube where it is concentrated with a nitrogen stream. The solution is seeded, if it has not spontaneously begun to crystallize, and is held at 0°C. for several hours. The product may be crystallized by dissolving, it in the minimum volume of methanol, diluting with several fold volumes of ethyl acetate, concentration to a gum under a nitrogen stream, and taking the residue up in a small volume of ethyl acetate. Cooling and seeding affords nearly colorless crystals. The uv spectrum in pH 7 buffer is now λmax 237 mμ, E% 319 and λinf 257.5, E% 229. The tlc on silica in 5:1:0.6 benzene:methanol:acetic acid shows a single spot, with no major contamination, which travels more slowly than cephalothin. The nmr (taken as the sodium salt in D$_2$O) is the same as that of the original sodium salt with less contamination by minor peaks. The product is 7-hydroxymethyl-7-(2-thienylacetamido)-cephalosporanic acid.

EXAMPLE 21

Benzhydryl 7-Trifluoromethanesulfonyloxymethyl-7-(4-Nitrobenzylideneamino)-Cephalosporanate A mixture of 1.35 g. of benzhydryl 7-hydroxymethyl-7-aminocephalosporanate tosylate salt as prepared in Example 14 is portioned between 2 ml. of ethyl acetate, 8 ml. of ether, and 730 mg. of dipotassium hydrogen phosphate in 10 ml. of water. After drying the organic phase with magnesium sulfate and removal of the solvent, the residue is combined with 282 mg. of 4-nitrobenzaldehyde and converted to the Schiff base by azeotropic distillation in a Dean-Stark apparatus with 60 ml. of benzene for one hour. The benzene is evaporated under reduced pressure and the residue, in 10 ml. of dry methylene chloride cooled to 0°C., is stirred and treated successively with 271 mg. of diisopropyl ethylamine in one ml. of methylene chloride and 592 mg. of freshly distilled trifluoromethanesulfonic anhydride in one ml. of methylene chloride, and stirred at 0°C. for 1.5 hours. The mixture is portioned between methylene chloride and ice water with shaking for several minutes. The organic phase is removed, dried with magnesium sulfate, and evaporated to a gum under reduced pressure. The desired material, benzhydryl 7-trifluoromethanesulfonyloxymethyl-7-(4-nitrobenzylideneamino)-cephalosporanate, is isolated and purified by chromatography. The nmr (CDCl$_3$) shows peaks at 517 (1H), 488, 480, 467, 468 (2H), 429 (10H), 406 (1H), 298 (1H), 284 (2H), 298, 284, 278, 264 (2H), 216, 198, 183, 174 (2H), and 109 (3H), expressed in cps downfield from tms. The ir (CDCl$_3$) showed β-lactam at 5.59 μ and ester at 5.74 μ. Bands are also present at 7.05, 8.74, and 10.30 μ, believed to be associated with the F$_3$CSO$_3$-group.

EXAMPLE 22

Benzhydryl 7-Azidomethyl-7-(4-Nitrobenzylideneamino)-Cephalosporanate and Benzhydryl 7-Azidomethyl-7-(4-Nitrobenzylideneamino)-3-Acetoxymethyl-2-Cephem-4-Carboxylate A 1 M solution of lithium azide is prepared in DMSO from lithium chloride and sodium azide, and 0.5 ml. are used to dissolve 26 mg. of benzhydryl 7-trifluoromethanesulfonyloxymethyl-7-(4-nitrobenzylideneamino)-cephalosporanate. After standing 20 minutes, the mixture is poured into methylene chloride and water, shaken and the phases separated. The aqueous phase is re-extracted twice with methylene chloride and the organic phases all combined, washed once with water and dried with magnesium sulfide. The solvent is evaporated under reduced pressure and the desired components separated by preparative tlc on an 8 inch × 8 inch × 250 μ silica gel plate, eluted with 2% ethyl acetate in chloroform. The faster half of the main bond, upon isolation, amounts to 8 mg. of crude benzhydryl 7-azidomethyl-7-(4-nitrobenzylideneamino)-3-acetoxymethyl-2-cephem-4-carboxylate, which has an ir (CHCl$_3$) with azide (4.75 μ), β-lactam (5.65 μ) and ester (5.73 μ) bonds; the 7.0–7.1 μ and 8.75 μ regions are without a bond. The nmr (CDCl$_3$) has peaks at 520 (1H), 494, 486, 475, 466 (4H), 436 (10H), 410 (1H), 379 (1H), 310 (1H), 303, 270, 217 (5H), 112 (3H), expressed in cps downfield from tms. The slower half of the bond affords 6 mg. of crude benzhydryl 7-azidomethyl-7-(4-nitrobenzylideneamino)-cephalosporanate which has an ir (CHCl$_3$) with azide (4.75 μ), β-lactam (5.63 μ), and ester (5.77 μ) bonds, while the 7.0–7.1 μ region is without a bond. The nmr (CDCl$_3$) shows peaks at 516 (1H), 496, 487, 475, 466 (2H), 436 (10H), 414 (1H), 304 (1H), 304, 293, 287, 273 (2H), 212 (2H), 207, 201 (2H), and 119 (3H), expressed in cps downfield from tms. The ms shows a molecular ion at 625 μ/c and ions corresponding to loss of CHφ$_2$ (459) and CO$_2$CHφ$_2$ (415) for both materials.

EXAMPLE 23

Benzyhydryl 7-Fluoromethyl-7-(4-Nitrobenzylideneamino)-3-Acetoxymethyl-2-Cephem-4-Carboxylate A solution of 33 mg. of benzhydryl 7-trifluoromethanesulfonyloxymethyl-7-(4-nitrobenzylideneamino)-cephalosporanate in 0.5 ml. dry acetonitrile containing ca. 10% molar excess of dry tetraethylammonium fluoride is allowed to stand for one hour, and is then worked up as above. The faster moving material obtained from preparative tlc has an ir (CHCl$_3$) showing β-lactam (5.62 μ) and ester (5.72) μ bonds, and only weak bonds at 7.0–7.1, 8.75, and 10.30 μ compared with starting material. The nmr (CDCl$_3$) shows peaks at 530 (1H), 501, 493, 481, 473 (4H), 440 (10H), 416 (1H), 287 (1H), 322 (1H), 307, 297, 275, 260 (5H), and 117 (3H) expressed in cps downfield from tms. The ms shows peaks at 603 (μ$^+$), 583 (μ$^+$-HF), 436 (μ$^+$-CHφ$_2$) and 392 (μ$^+$-CO$_2$CHφ$_2$) μ/c.

What is claimed is:

1. The process of preparing a compound having the formula:

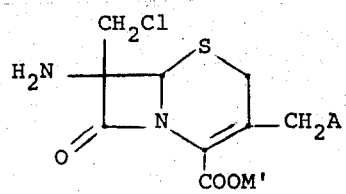

wherein M' is benzyl, benzhydryl, trimethylsilyl, trichloroethyl, methoxymethyl, benzoylmethyl, or methoxybenzyl; A is hydrogen, loweralkanoyloxy, carbamoyloxy, thiocarbamoyloxy, N-loweralkylcarbamoyloxy, N,N-diloweralkylcarbamoyloxy, N-loweralkylthiocarbamoyloxy, or N,N-diloweralkylthiocarbamoyloxy;

which comprises the steps of reacting a compound of the formula:

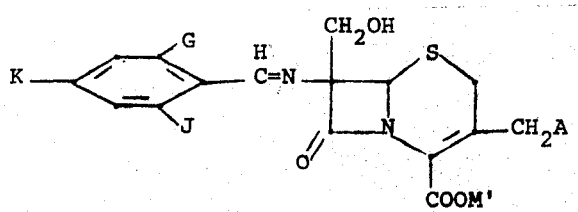

wherein M' and A are as defined above;

and wherein each of G, K, and J are hydrogen, halo, nitro, methyl sulfonyl, carboxyester, carboxyamide, or cyano, with p-nitrobenzenesulfonyl chloride, p-toluenesulfonyl chloride, methanesulfonyl chloride, or trifluoromethanesulfonic anhydride in the presence of a tertiary loweralkyl amine to yield a compound having the formula:

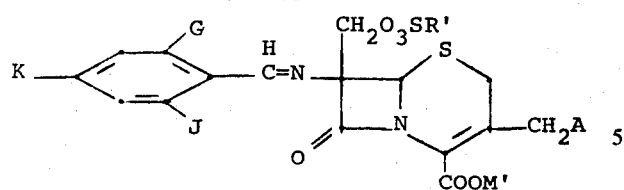

wherein K, G, J, A and M', are the same as above, and R' is p-nitrophenyl, p-methylphenyl, methyl or trifluoromethyl; reacting said latter product with lithium chloride, to produce a compound of the formula:

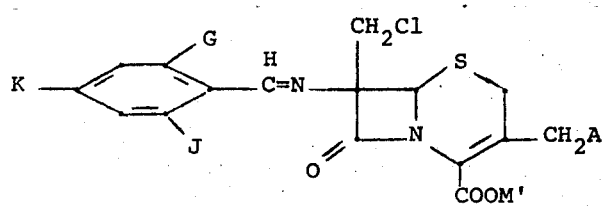

where K, G, J and A, are as previously defined; and treating said product with aniline hydrochloride, or hydrazine, phenylhydrazine, 2,4-dinitrophenylhydrazine in the presence of a catalytic amount of a mineral acid such as hydrochloric or p-toluenesulfonic acid; and thereafter recovering the desired product.

2. The process of claim 1 in which (Z) is

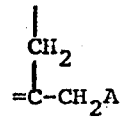

and A is as previously defined.

3. The process of claim 2 in which A is loweralkanoyloxy or carbamoyloxy.

4. The process of claim 3 in which A is acetoxy.

5. The process of claim 3 in which A is carbamoyloxy.

* * * * *